United States Patent
Phillips et al.

[11] Patent Number: 5,952,476
[45] Date of Patent: Sep. 14, 1999

[54] RED REACTIVE DYESTUFFS

[75] Inventors: Duncan Adrian Sidney Phillips, Lancs, United Kingdom; Yung-Chien Kao, Taoyuan, Taiwan

[73] Assignee: Everlight USA, Inc., Pinesville, N.C.

[21] Appl. No.: 09/137,307

[22] Filed: Aug. 21, 1998

[51] Int. Cl.⁶ .......... C09B 62/507; C09B 62/47; D06P 1/38
[52] U.S. Cl. .......... 534/637; 534/632; 534/638
[58] Field of Search .................. 534/632, 637, 534/638

[56] References Cited

U.S. PATENT DOCUMENTS

| | | | |
|---|---|---|---|
| 4,908,436 | 3/1990 | Scheibli | 534/637 |
| 5,554,733 | 9/1996 | Tzikas et al. | 534/638 |
| 5,731,421 | 3/1998 | Tzikas et al. | 534/638 |
| 5,750,662 | 5/1998 | Reichert et al. | 534/637 X |

FOREIGN PATENT DOCUMENTS 50-157420  12/1975  Japan.

OTHER PUBLICATIONS

Shirasaki et al., Chemical Abstracts, 84:123388 (1976) Abstract of JP 50–157,420, Dec. 10, 1975.

Primary Examiner—Fiona T. Powers
Attorney, Agent, or Firm—Bacon & Thomas PLLC

[57] ABSTRACT

A red reactive dyestuff of the formula (I)

wherein the substituents have the meaning given in the description. The red reactive dyestuff of the present invention is suitable for dying and printing on cellulose fiber such as cotton, artificial cotton, linen and artificial linen, etc., and polyamide and polyurethane fibers like wool, silk and nylon, etc. It is also suitable for dying and printing on mixed or cross-linking spinning of cellulose fiber or polyamide fiber and polyurethane fiber, polyacrylonitrile fiber and other fiber.

12 Claims, No Drawings

RED REACTIVE DYESTUFFS

FIELD OF THE INVENTION

The present invention relates to novel red reactive dyestuffs.

BACKGROUND OF THE INVENTION

Reactive dyestuff generally indicates that dye molecule contains a reactive functional group that can react with fiber. It can react to the hydroxyl group of cellulose fiber or the amide, imino and carboxylic acid group in animal and polyamide synthetic fibers. Thus, with the covalent bonding between the dyestuff and fiber, the purpose of dying is achieved.

Red (or yellowish red) reactive dyestuffs are already known from U.S. Pat. Nos. 5,075,428, 5,354,849, and 5,359,042.

SUMMARY OF THE INVENTION

The present invention relates to novel red reactive dyestuffs of the formula (I)

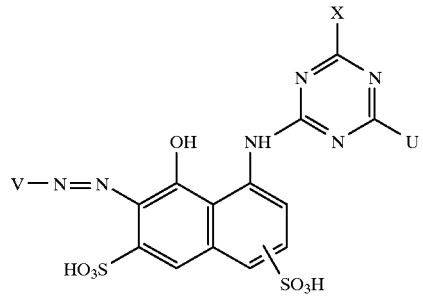

(I)

wherein:
X is halogen;
U is —NH—Y—Z or

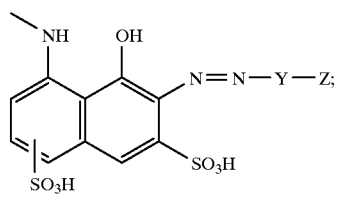

V is —Y'—Z', wherein
each of Y and Y' independently is phenyl, phenyl sulfonic acid, naphthyl, or naphthyl sulfonic acid;
each of Z and Z' independently is reactive functional group of —NH—CO—CHBr—CH$_2$Br, —NH—CO—CBr=CH$_2$, —SO$_2$—CH=CH$_2$ or —SO$_2$CH$_2$CH$_2$—OSO$_3$H, and at least one of Z and Z' is —NH—CO—CHBr—CH$_2$Br, or —NH—CO—CBr=CH$_2$.

The dyestuff of formula (I) of the present invention is suitable for dyeing and printing on cellulose fiber such as cotton, artificial cotton, linen and artificial linen, etc., and polyamide and polyurethane fibers like wool, silk and nylon, etc. It is also suitable for dying and printing on mixed or cross-linking spinning of cellulose fiber or polyamide fiber and polyurethane fiber, polyacrylonitrile fiber and other fiber. The dyed material shows a color superior in various fastness properties.

The dyestuff of formula (I) of the present invention contains several reactive functional groups. Dyeing on cellulose fiber brings out the special quality of high absorption, high build-up and high fastness property. Due to the storing stability of this dyestuff and the highly stable covalent bonding between fibers, a firmly dyed material can be achieved. Its high usage ratio means lower cost, and decreases or completely eliminates the environmental problem caused by waste water.

DESCTIPTION OF THE PREFERRED EMBODIMENTS

The dyestuff of formula (I) of the present invention can be synthesized by the following methods:
A) 1-amino-8-hydroxynaphthyl-disulfonic acid reacts with trihalogentriazine to get formula (a),

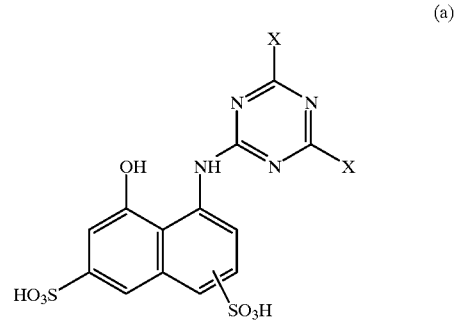

(a)

wherein X is halogen, then is coupling reacted with diazo salts of V—NH$_2$ to get formula (b)

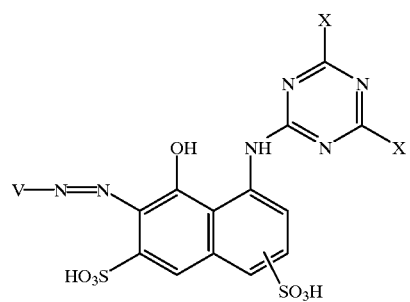

(b)

Wherein V has same definition as the above, then reacts with NH$_2$—Y—Z to obtain formula (Ia),

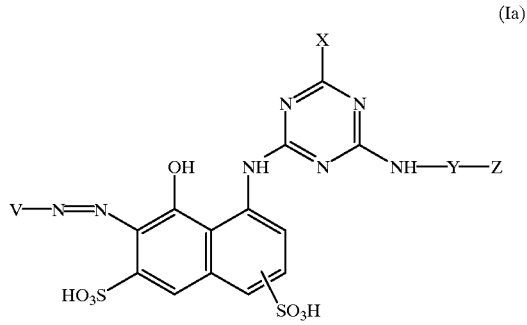

(Ia)

wherein V, X, Y and Z have definition as the above.

B) React formula (a) with NH₂—Y—Z to obtain formula (c)

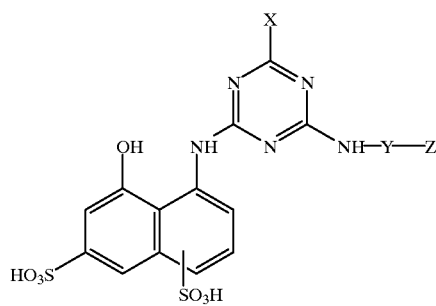

(c)

wherein X, Y and Z have definition as the above, then is coupling reacted with diazo salts of V—NH₂ to get formula (Ia), wherein V has definition as the above.

C) React the compound of formula(b) with 1-amino-8-hydroxynaphthyl-disulfonic acid to get foumula(d),

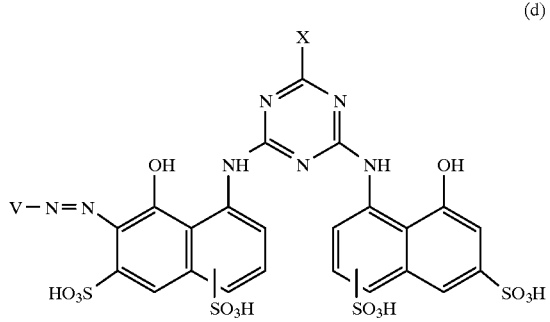

(d)

wherein V and X have definition as the above, then is coupling react with diazo salts of NH₂—Y—Z to obtain formula (Ib),

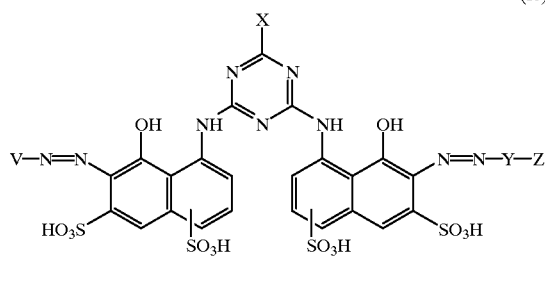

(Ib)

wherein V, X, Y and Z have the same definition as the above.

D) React formula (a) with diazo salts of NH₂—Y—Z to get formula (e),

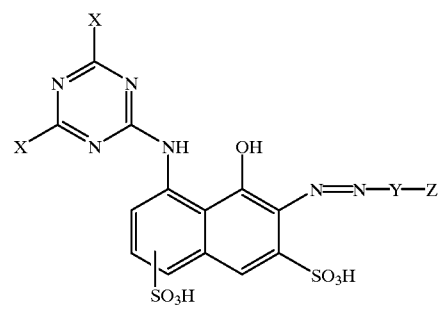

(e)

then reacts with 1-amino-8-hydroxynaphthyl-disulfonic acid to get formula (f),

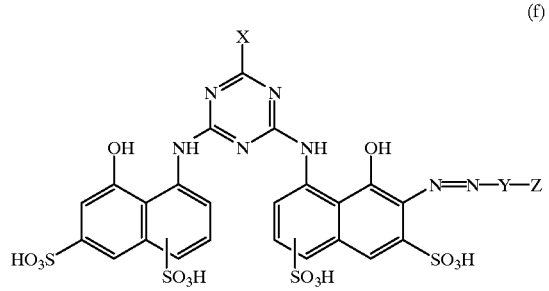

(f)

wherein X, Y and Z have the same definition as the above, then is coupling reacted with diazo salts of V—NH₂ to get formula (Ib), Wherein V has same definition as the above, E) React the compound of formula (b) with NH₂—Y—NH₂ to obtain formula (g),

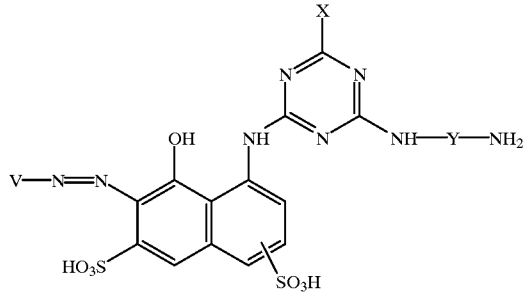

(g)

Wherein Y has definition as the above, then condensed with 2,3-dibromo-propionyl chloride to get formula (Ic),

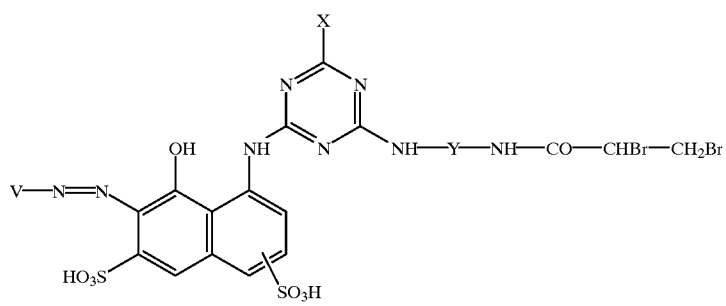

wherein V, X and Y have the same definition ad the above.

V—$NH_2$(i.e., $NH_2$—Y'—Z') and $NH_2$—Y—Z in the synthesis processes described above, wherein Z or Z' is either —$SO_2$—CH=$CH_2$ or —$SO_2CH_2CH_2$—$OSO_3H$, can be selected from the materials such as those in the following:

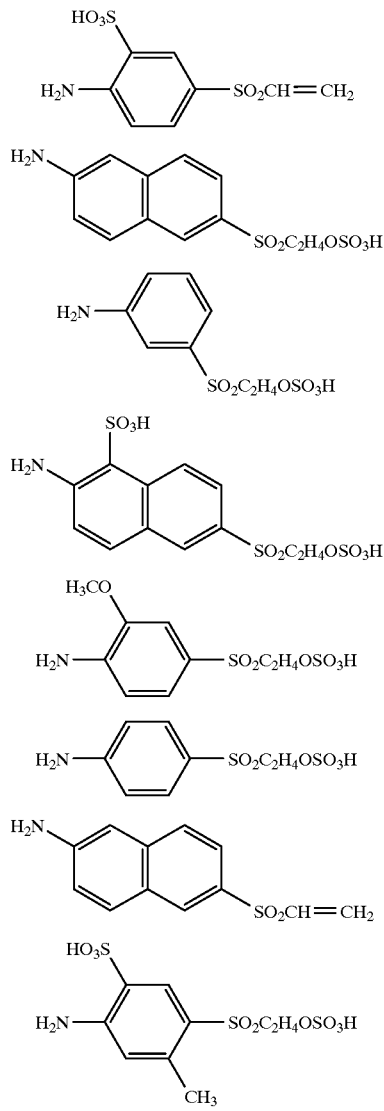

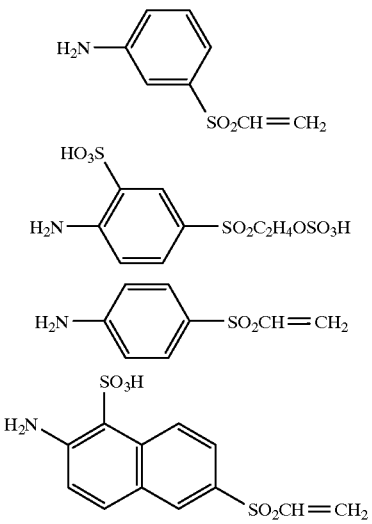

In addition, in the synthesis processes described above, in the V—$NH_2$(i.e., $NH_2$—Y'—Z') and $NH_2$—Y—Z, if the Z or Z' is either —NH—CO—CHBr—$CH_2$Br or —NH—CO—CBr=$CH_2$, it can be prepared by itself, such as, React $NH_2$—Y—$NH_2$ (or $NH_2$—Y'—$NH_2$) with Cl—CO—CHBr—$CH_2$Br to get $NH_2$—Y—NH—CO—CHBr—$CH_2$Br (or $NH_2$—Y'—NH—CO—CHBr—$CH_2$Br), then process it with NaOH aqueous solution to obtain $NH_2$—Y—NH—CO—CHBr=$CH_2$ (or $NH_2$—Y'—NH—CO—CHBr=$CH_2$).

More detailed examples are used to illustrate the present invention, and these examples are used to explain the present invention. The examples below, which are given simply by way of illustration, must not be taken to limit the scope of the invention.

In examples, the compound is represented by free acid, but its actual form can be metallic salt, or more possibly alkali salt, especially sodium salt.

EXAMPLE 1

Cyanuric chloride(5.5 g) was put in 120 ml of icy water. Add a solution of 1-amino-8-hydroxynaphthyl-3,6-disulfonic acid(9.6 g) in 100 ml of water and stir for 1.5 h to form solution(1).

A solution of 4-amino-phenyl-β-sulfato ethyl sulfone diazo salt (prepared from 8.4 g 4-amino-phenyl-β-sulfato-ethyl sulfone) was added into solution (1). The mixture was stirred at a temperature of 5° C. and a pH of 6.0–6.5 until fully reacted. A solution of 2,4-diaminobenzene sulfonic acid (5.6 g) in 75 ml water was added into the resultant mixture, then stirred at room temperature and a pH of 6.0–6.5 until fully reacted. Add 7.5 g of 2,3-dibromo-propionyl chloride and stir until fully reacted to get dyestuff as formula (I-1). After salted out with sodium chloride, red powder can thus be obtained. The dyestuff can be used to dye objects in red, with excellent property.

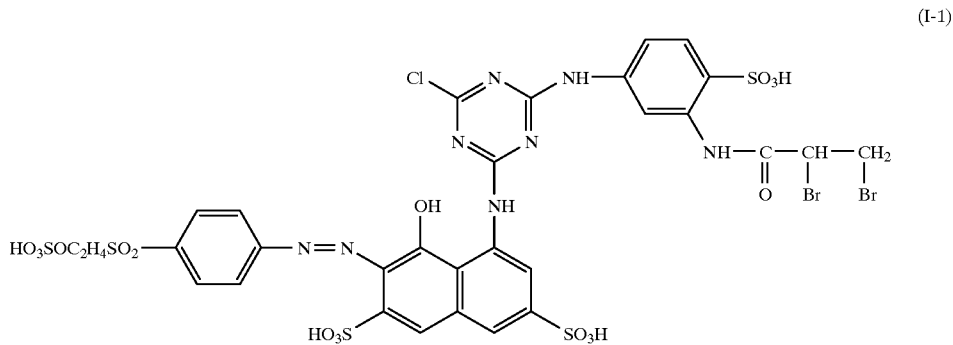

(I-1)

EXAMPLE 2

Cyanuric chloride(5.5 g) was dissolved in 120 ml of icy water. Add a solution of 1-amino-8-hydroxynaphthyl-3,6-disulfonic acid(9.6 g) in 100 ml of water and stir for 1.5 h to form solution(2).

A solution of 2-aminonaphthalene-6-β-sulfatoethyl sulfone-1-sulfonic acid diazo salt (prepared from 12.3 g 2-aminonaphthalene-6-β-sulfatoethyl sulfone-1-sulfonic acid) was added into solution (2). The mixture was stirred at a temperature of 5° C. and a pH of 2.0–2.5 until fully reacted. A solution of 2,4-diaminobenzoic acid(5.6 g) in 75 ml water was added into the resultant mixture, then stirred at room temperature and a pH of 6.0–6.5 until fully reacted. Add 7.5 g of 2,3-dibromo-propionyl chloride and stir until fully reacted to get dyestuff as formula (I-2). After salted out with sodium chloride, red powder can thus be obtained. The dyestuff can be used to dye objects in red, with excellent property.

EXAMPLE 3

Cyanuric chloride(5.5 g) was dissolved in 120 ml of icy water. Add a solution of 1-amino-8-hydroxynaphthyl-3,6-disulfonic acid(9.6 g) in 100 ml of water and stir for 1.5 h to form solution(3).

Add 7.5 g of 2,3-dibromo-propionyl chloride to a solution of 2,4-diaminobenzene sulfonic acid (5.6 g) in 75 ml water and stir at a temperature of 5° C. and a pH of 5.5–6.0 until fully reacted. The resultant solution was diazotized by the conventional method to form diazo salt solution. The diazo salt solution was added into solution (3). The mixture was stirred at a temperature of 5° C. and a pH of 2.0–2.5 until fully reacted. A solution of 4-amino-phenyl-β-sulfate ethyl sulfone (8.4 g) in 75 ml water was added into the above result mixture, then stirred at room temperature and the pH of 6.0–6.5 until fully reacted to get dyestuff as formula (I-3). After salted out with sodium chloride, red powder can thus be obtained. The dyestuff can be used to dye objects in red, with excellent property.

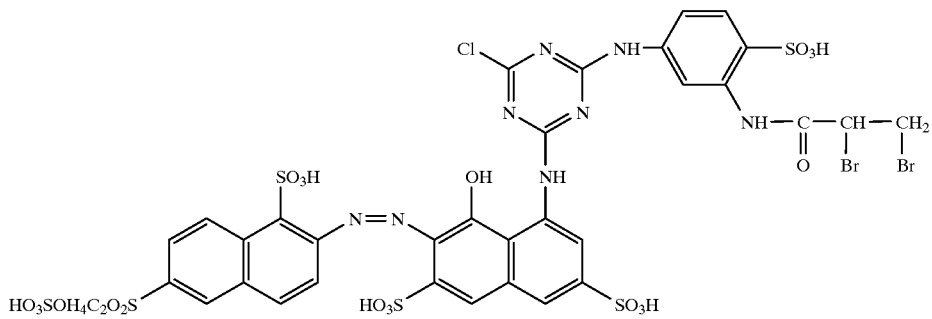

(I-2)

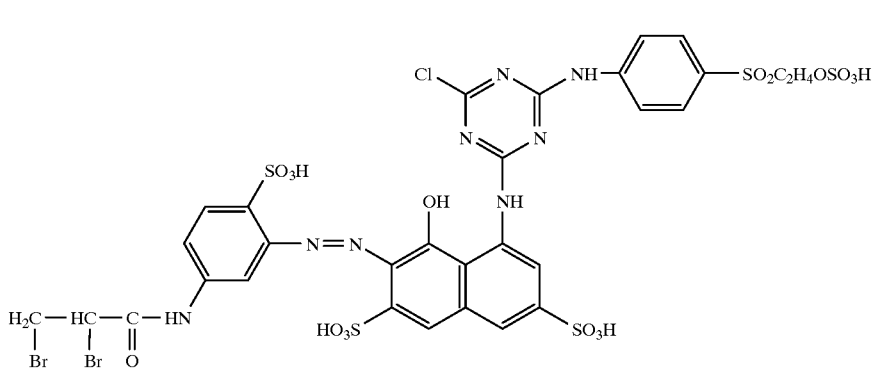

(I-3)

EXAMPLE 4

Cyanuric chloride(5.5 g) was dissolved in 120 ml of icy water. Add a solution of 1-amino-8-hydroxynaphthyl-disulfonic acid(9.6 g) in 100 ml of water and stir for 1.5 h to form solution(4).

A solution of 4-amino-phenyl-β-sulfato ethyl sulfone diazo salt (prepared from 8.4 g 4-amino-phenyl-β-sulfato ethyl sulfone) was added into solution (4). The mixture was stirred at a temperature of 5° C. and a pH of 6.0–6.5 until fully reacted. A solution of 1-amino-8-hydroxynaphthyl-3,6-disulfonic acid (9.6 g) in 75 ml water was added into the resultant mixture, then stirred at room temperature for 2 hours to form solution (5).

Add 7.5 g of 2,3-dibromo-propionyl chloride to a solution of 2,4-diaminobenzene sulfonic acid (5.6 g) in 75 ml water and stir at a temperature of 5° C. and a pH of 5.5–6.0 until fully reacted. The resultant solution was diazotized by the conventional method to form diazo salt solution. The diazo salt solution was added into solution (5). The mixture was stirred at a temperature of 5° C. and a pH of 2.0'2.5 until fully reacted to get dyestuff as formula (I-4). After salted out with sodium chloride, red powder can thus be obtained. The dyestuff can be used to dye objects in red, with excellent property.

EXAMPLE 5

Cyanuric chloride(5.5 g) was dissolved in 120 ml of icy water. Add a solution of 1-amino-8-hydroxynaphthyl-disulfonic acid(9.6 g) in 100 ml of water and stir for 1.5 h to form solution(6).

A solution of 2-aminonaphthalene-6-β-sulfato ethyl sulfone-1-sulfonic acid diazo salt (prepared from 12.3 g 2-aminonaphthalene-6-β-sulfato ethyl sulfone-1-sulfonic acid) was added into solution (6). The mixture was stirred at a temperature of 5° C. and a pH of 2.0–2.5 until fully reacted. A solution of 1-amino-8-hydroxynaphthyl-3,6-disulfonic acid (9.6 g) in 75 ml water was added into the resultant mixture, then stirred at room temperature for 2 hours to form solution (7).

Add 7.5 g of 2,3-dibromo-propionyl chloride to a solution of 2,4-diaminobenzene sulfonic acid (5.6 g) in 75 ml water and stir at a temperature of 5° C. and a pH of 5.5–6.0 until fully reacted. The resultant solution was diazotized by the conventional method to form diazo salt solution. The diazo salt solution was added into solution (7). The mixture was stirred at a temperature of 5° C. and a pH of 2.0–2.5 until fully reacted to get dyestuff as formula (I-5). After salted out with sodium chloride, red powder can thus be obtained. The dyestuff can be used to dye objects in red, with excellent property.

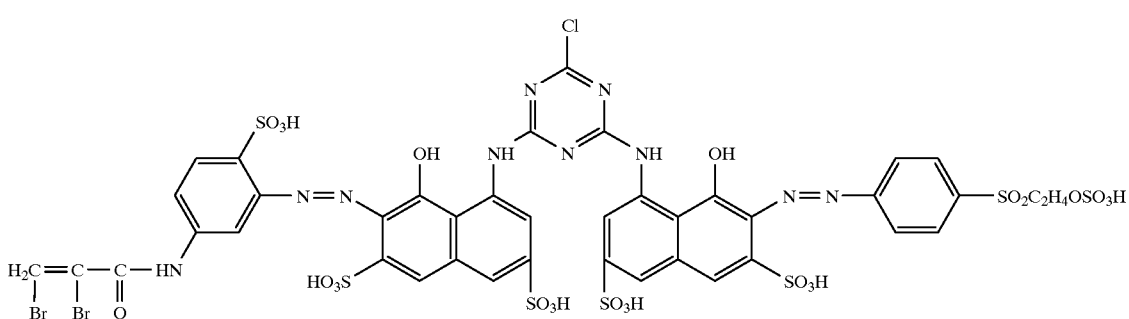

(I-4)

(I-5)

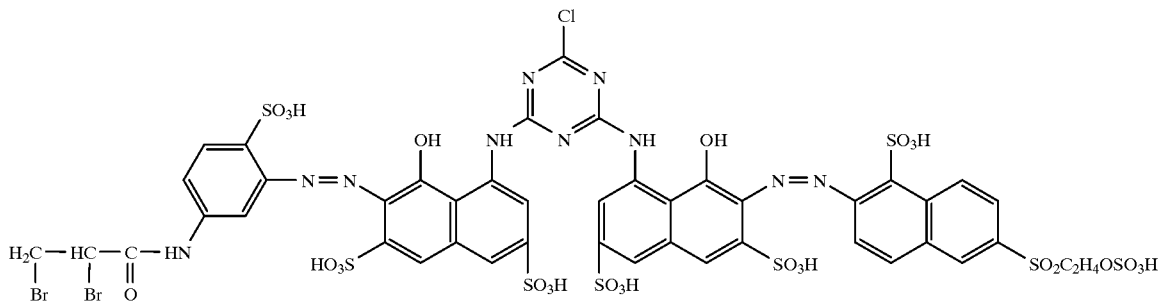

EXAMPLE 6

Cyanuric chloride(5.5 g) was dissolved in 120 ml of icy water. Add a solution of 1-amino-8-hydroxynaphthyl-3,6-disulfonic acid(19.2 g) in 100 ml of water and stir at a temperature of 5° C. for 1.5 h, then stir at a pH of 6.0–6.5 and a temperature of 30° C. for 3 hours to form solution(8).

Add 2,3-dibromo-propionyl chloride (15 g) to a solution of 2,4-diaminobenzene sulfonic acid (11.2 g) in 75 ml water and stir at a temperature of 5° C. and a pH of 5.5–6.0 until fully reacted. The resultant solution was diazotized by the conventional method to form diazo salt solution. The diazo salt solution was added into solution (8). The mixture was stirred at a temperature of 5° C. and a pH of 2.0–2.5 until fully reacted to get dyestuff as formula (I-6). After salted out with sodium chloride, red powder can thus be obtained. The dyestuff can be used to dye objects in red, with excellent property.

(I-6)

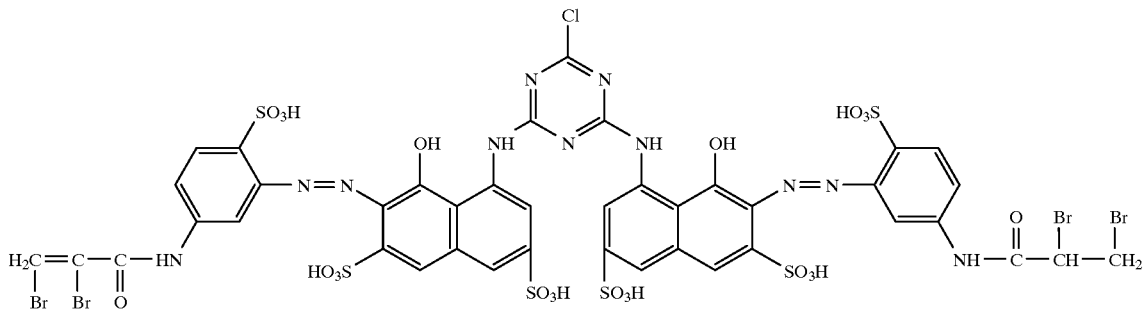

EXAMPLE 7

Formula (I-1) dyestuff (5.5 g) was dissolved in 100 ml water. Add NaOH aqueous solution to control pH value at 12–12.5 and stir at a temperature of 0° C.–5° C. for 1.5 h. Then use HCl aqueous solution to adjust pH value to 7.0 to form formula (I-7) dyestuff. Red powder can thus be obtained. The dyestuff can be used to dye objects in red, with excellent property.

(I-7)

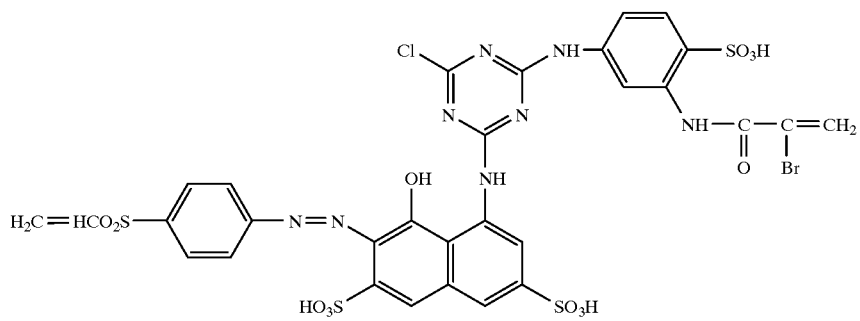

EXAMPLE 8–12
Repeat steps in Example 7. Replace formula (I-1) with formula (I-2), (I-3), (I-4), (I-5), and (I-6) dyestuff to form formula (I-8), (I-9), (I-10), (I-11), and (I-12) dyestuffs respectively. The dyestuff can be used to dye objects in red, with excellent property.
(I-8)
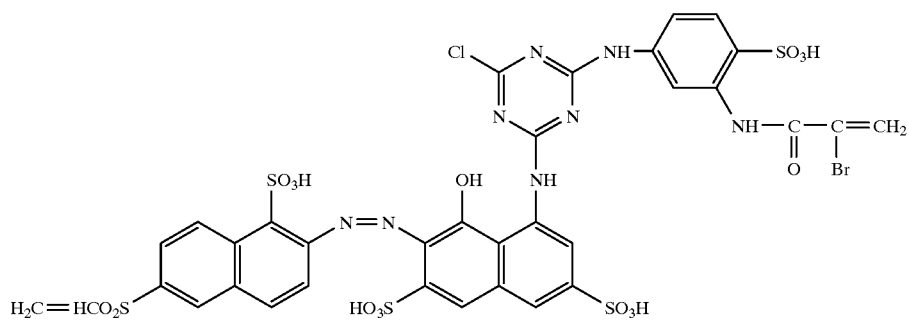
(I-9)
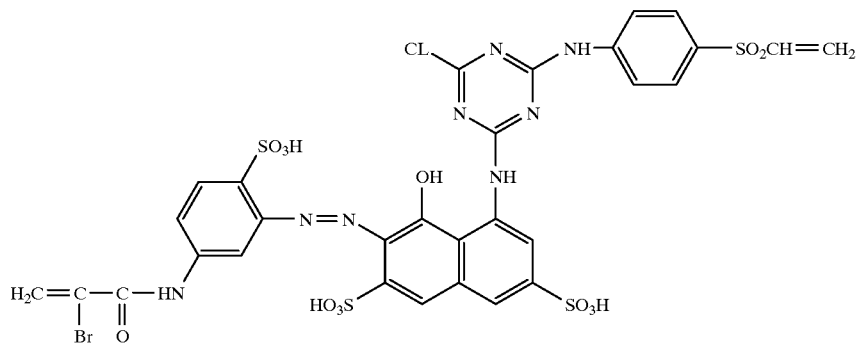
(I-10)
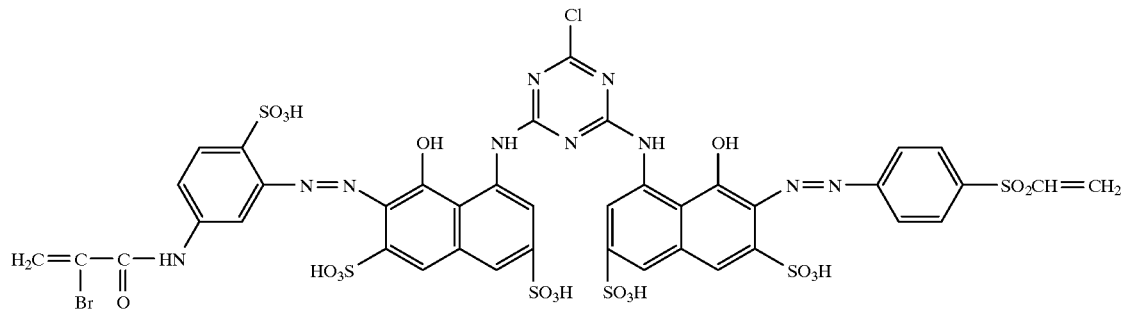
(I-11)
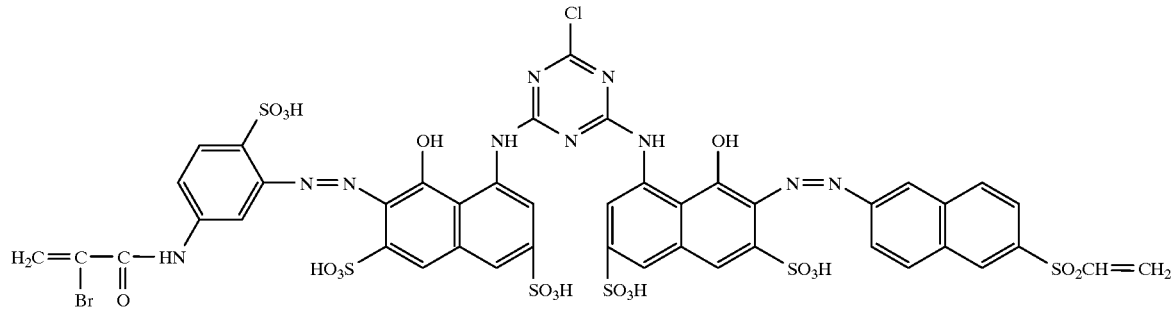

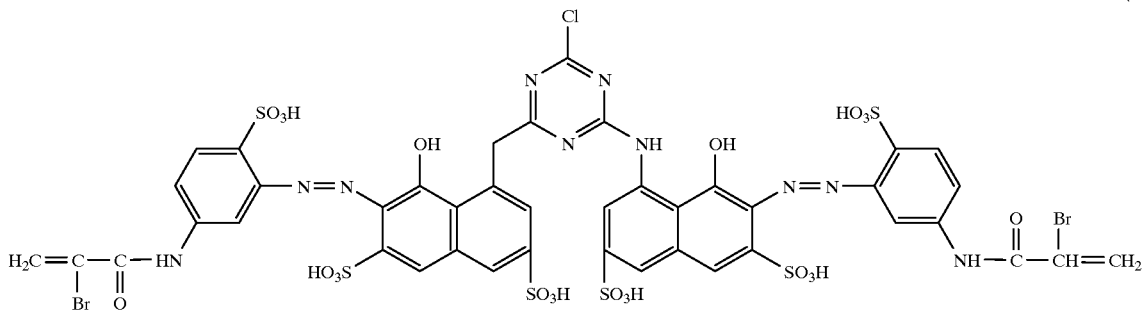

(I-12)

Dye testing:
a. Take the above dyestuff one part to completely dissolve in 1000 parts distilled water to get dyeing solution.
b. Then take two dyeing bottles washed with distilled water and put dyeing solution 40 parts and 80 parts into each bottle then finally add 4.8 parts Glauber's salt into each bottle.
c. Distilled water is added to each bottle to get total 85 parts.
d. Add 320 g/l pure base 5 parts to each bottle.
e. Take two parts prewetting full cotton woven fabric into each dyeing bottle. The top of the bottle is covered with a lid and shaken to get homogeneous dye.
f. Put dyeing bottle into a thermobath at 62° C., and heated up to 60° C. in 5 minutes and kept at the same temperature for 60 minutes. The fabric is taken out and washed with cold water, then put into a big stainless bucket washed with hot water for 10 minutes, then put fabric into another big stainless bucket with 2 g/l soaping agent, washed with boiling water for another 10 minutes.
g. The fabric is taken out washed with cold water then dried.

The dyestuff of the present invention is a multi-functional reactive dyestuff that contains various reactive groups. Dyeing on cellulose fiber brings out the special quality of high absorption, high build-up and better fastness property and this type of dyestuff has the characteristic of high storing stability and highly stable covalent bonding between dyestuff and fibers. The highly reproducible dyeing can be obtained. The theory of high fastness property of dyed color can be obtained, developing another type of variation of multi-functional reactive dyestuff that contains various reactive groups. This type of dyestuff may lower the amount of dyestuff remained in the dyeing wastewater due to its property of high build-up. Its high usage rate means lowering cost and decreases or completely eliminates the environment problem caused by dyestuff wastewater. Therefore, we introduce various reactive functional groups in the dyestuff's main contents to allow the cellulose fiber obtaining the quality of high absorption, high build-up and fastness property during dyeing process. Nevertheless, the highly reproducible dyeing can be obtained. A dyed object with highly fastness property can be achieved.

From the foregoing description, one skilled in the art can easily ascertain the essential characteristics of this invention, and with departing from the spirit and scope thereof, can make various changes and modifications of the invention to adapt it to various usages and conditions. Thus, other embodiments are also within the claims.

What the invention claimed is:

1. A red reactive dyestuff of formula (I)

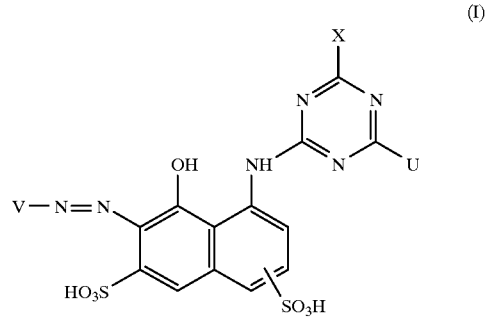

(I)

wherein:

X is halogen;

U is —NH—Y—Z or

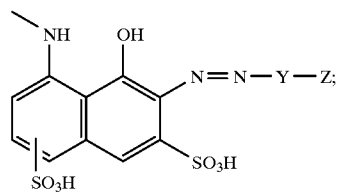

V is —Y'—Z', wherein Y is naphthyl, or naphthyl sulfonic acid;

and Y' is phenyl, phenyl sulfonic acid, naphthyl, or naphthyl sulfonic acid;

each of Z and Z' independently is a reactive functional group of —NH—CO—CHBr—CH$_2$Br, —NH—CO—CBr=CH$_2$, —SO$_2$—CH=CH$_2$ or —SO$_2$CH$_2$CH$_2$—OSO$_3$H, and at least one of Z and Z' is —NH—CO—CHBr—CH$_2$Br, or —NH—CO—CBr=CH$_2$.

2. A red reactive dyestuff of claim 1, wherein Y' is phenyl or phenyl sulfonic acid.

3. A red reactive dyestuff of claim 1, wherein Z is —NH—CO—CHBr—CH$_2$Br or —NH—CO—CBr=CH$_2$.

4. A red reactive dyestuff of claim 1, wherein Z' is —NH—CO—CHBr—CH$_2$Br or —NH—CO—CBr=CH$_2$.

5. A red reactive dyestuff of claim 1, wherein X is —Cl.

6. A red reactive dyestuff of claim 1, wherein U is —NH—Y—Z.

7. A red reactive dyestuff of claim 1, wherein U is

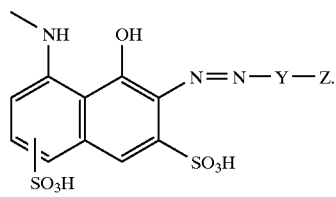

.

8. A red reactive dyestuff of claim 1, wherein formula (I) is the formula (I') as below

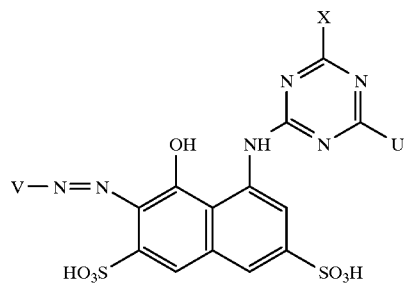

(I')

wherein:

X is halogen;

U is —NH—Y—Z or

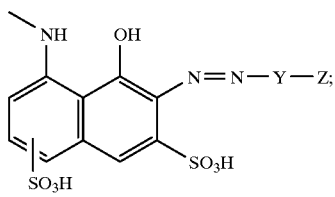

;

V is —Y'—Z', wherein Y is naphthyl, or naphthyl sulfonic acid;

and Y' is phenyl, phenyl sulfonic acid, naphthyl, or naphthyl sulfonic acid;

each of Z and Z' independently is a reactive functional group of —NH—CO—CHBr—CH$_2$Br, —NH—CO—CBr=CH$_2$, —SO$_2$—CH=CH$_2$ or —SO$_2$CH$_2$CH$_2$—OSO$_3$H, and at least one of Z and Z' is —NH—CO—CHBr—CH$_2$Br, or —NH—CO—CBr=CH$_2$.

9. A red reactive dyestuff of claim 8, wherein Y' is phenyl or phenyl sulfonic acid.

10. A red reactive dyestuff of claim 8, wherein Z is —NH—CO—CHBr—CH$_2$Br or —NH—CO—CBr=CH$_2$.

11. A red reactive dyestuff of claim 8, wherein Z' is —NH—CO—CHBr—CH$_2$Br or —NH—CO—CBr=CH$_2$.

12. A red reactive dyestuff of claim 8, wherein X is —Cl.

* * * * *